United States Patent [19]

Kelley, Jr.

[11] 4,121,150
[45] Oct. 17, 1978

[54] GAIN COMPENSATION FOR POWER FACTOR IN LINE CURRENT REGULATING SYSTEMS INVOLVING REACTIVE POWER

[75] Inventor: Fred William Kelley, Jr., Media, Pa.

[73] Assignee: General Electric Company, Philadelphia, Pa.

[21] Appl. No.: 818,363

[22] Filed: Jul. 25, 1977

[51] Int. Cl.² .......................... G05F 1/68; H02J 3/18
[52] U.S. Cl. ..................................... 323/102; 13/12; 324/107
[58] Field of Search ................... 13/12; 323/6, 8, 101, 323/102, 105, 106, 108, 109, 110, 111, 121, 122, 124, 126–128; 324/107

[56] References Cited

U.S. PATENT DOCUMENTS

| | | | |
|---|---|---|---|
| 3,936,727 | 2/1976 | Kelly, Jr. et al. | 323/102 |
| 3,936,978 | 6/1976 | Kelly, Jr. et al. | 13/12 X |
| 3,968,432 | 7/1976 | Kelly, Jr. | 324/107 |
| 4,055,795 | 10/1977 | Mathieu | 323/102 |

*Primary Examiner*—Gerald Goldberg
*Attorney, Agent, or Firm*—William Freedman; Carl L. Silverman

[57] ABSTRACT

In an alternating current electric power system of the type subject to rapid load voltage regulation as a result of variations in reactive load current, reactive load current compensation is provided by fixed capacitors and inductors in parallel with the load, the inductors being in series with static switches which are phase controlled to continuously maintain the net reactive compensating current substantially equal and opposite to the reactive component of load current. Compensation control determines firing time of the static switches in accordance with the magnitude of reactive load current. Regulating means additionally controls firing time to maintain line current and line to neutral voltage at a selected line location substantially in phase coincidence. The regulating means is provided with means for enhancing the stability of the system under no load or light load conditions. In a preferred embodiment, regulation stability is enhanced through the application of a small real or, in phase current signal whenever the real or in phase component of actual line current at the selected line location is less than a predetermined level which is desirable for stable regulation of the power system.

15 Claims, 8 Drawing Figures

$I_L = I_R - JI_x$ $\theta = TAN^{-1} \dfrac{I_c - I_x}{I_R}$

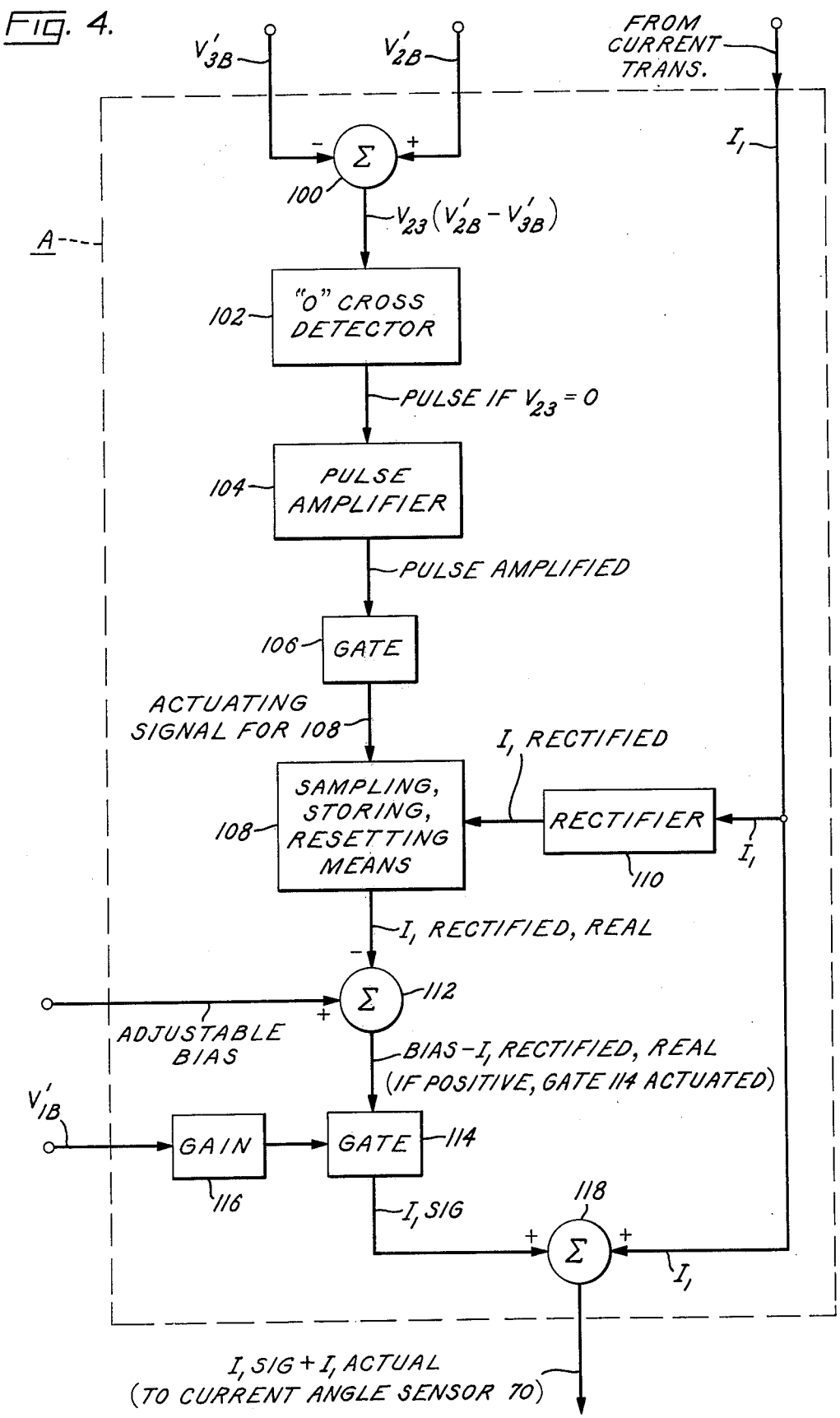

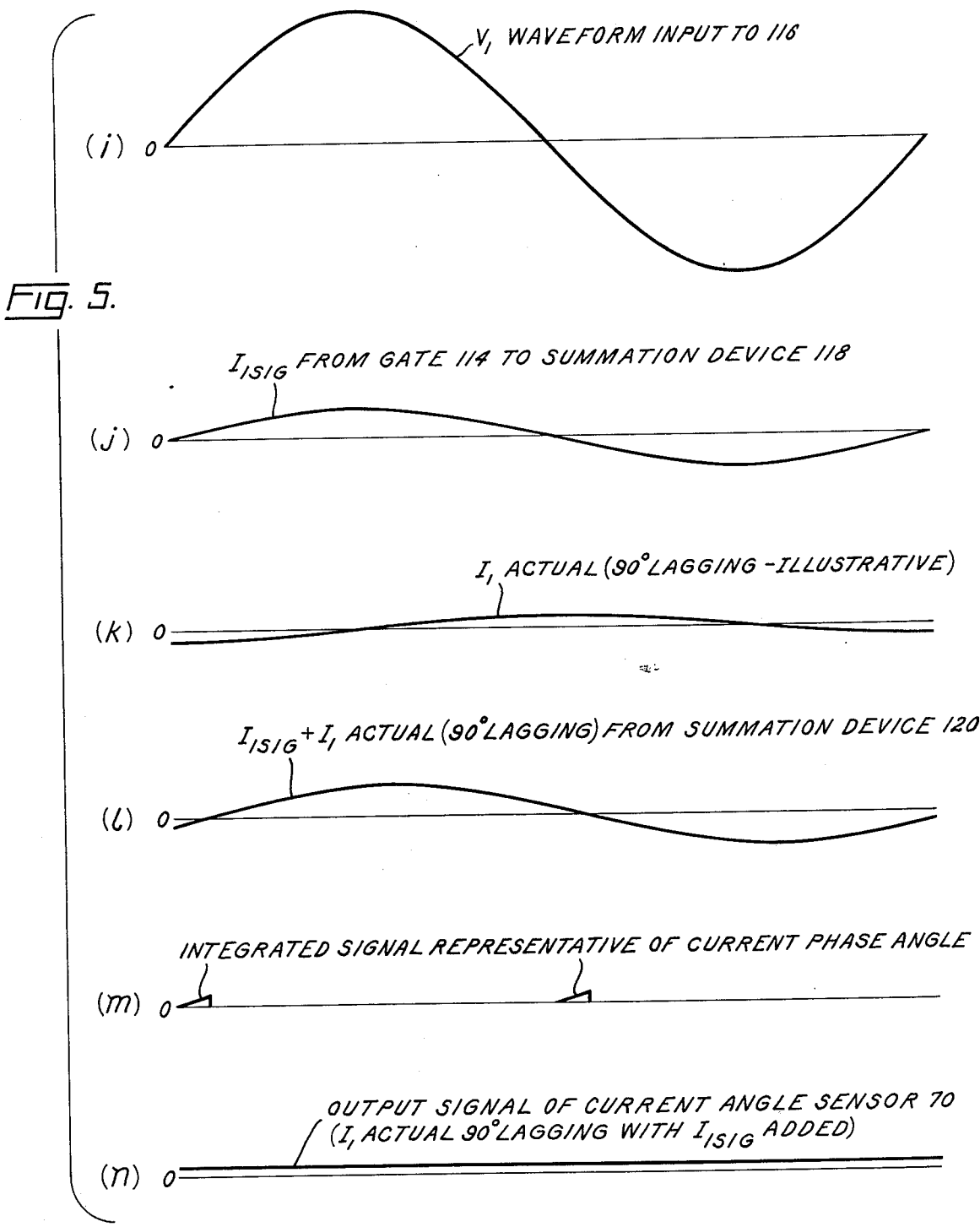

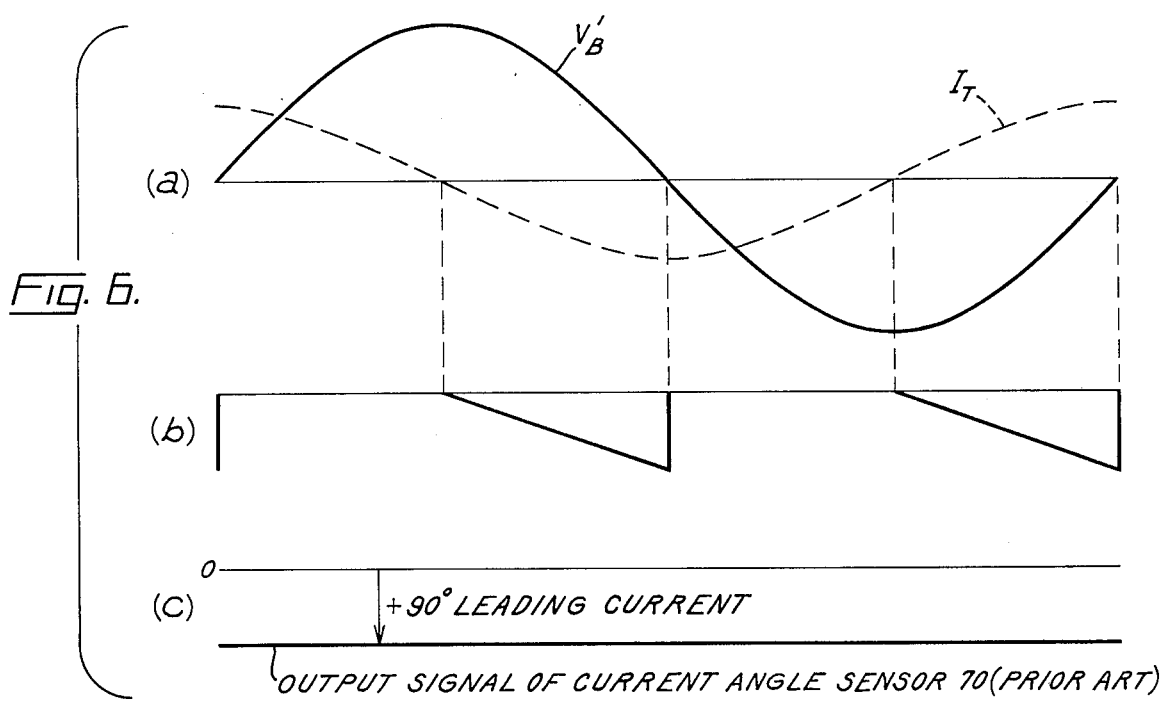
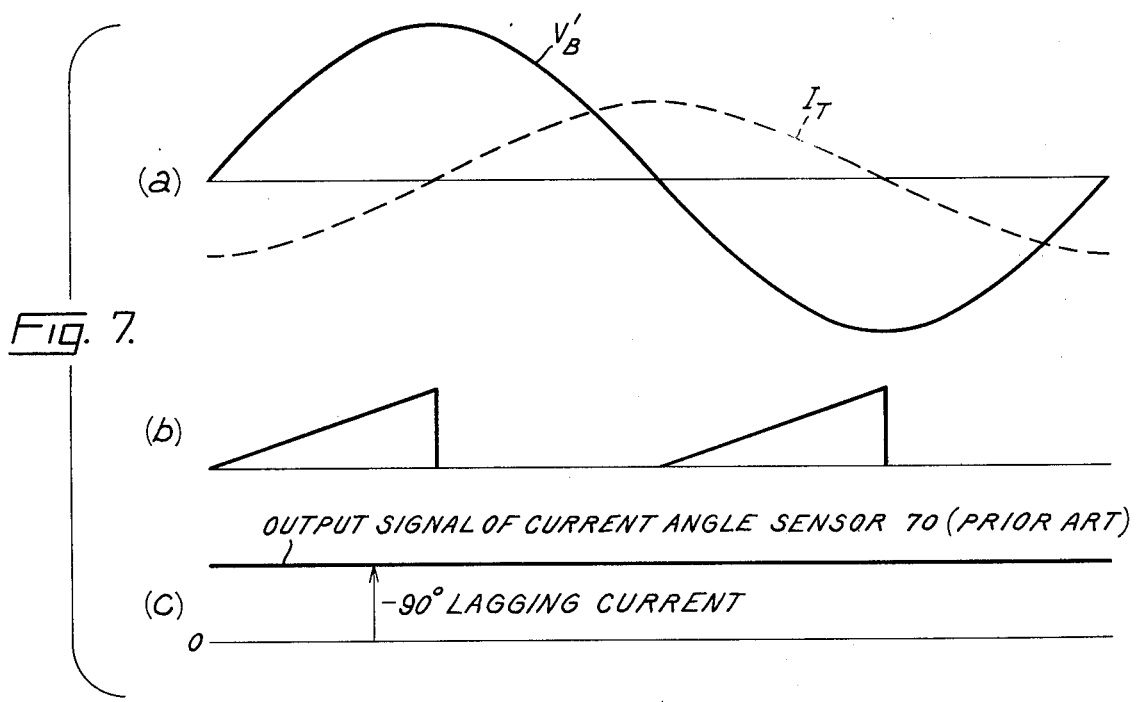

GAIN COMPENSATION FOR POWER FACTOR IN LINE CURRENT REGULATING SYSTEMS INVOLVING REACTIVE POWER

BACKGROUND OF THE INVENTION

The present invention relates to control of compensating impedance connected to supply leading or lagging reactive current to an electric power system for stabilization of voltage, and particularly to a control system in which regulation stability is enhanced under no load or light load conditions.

It is known that electric power systems which supply highly erratic reactive loads, e.g., electric arc furnaces, are typically characterized by poor voltage regulation. Consequently, these systems often exhibit an undesirable flicker. One system suggested to alleviate this condition is disclosed in U.S. Pat. No. 3,936,727, issued to Kelley et al, on Feb. 3, 1976, which is hereby incorporated by reference in the present application. The Kelley et al patent is assigned to the assignee of the present application.

The Kelley et al system is generally illustrated in FIGS. 1 & 2. Briefly, the system includes the use of two control loops: one open compensating control loop; and one closed regulating or supervisory control loop. The compensating control loop senses the reactive load current component and attempts to negate the same by providing the appropriate compensating reactive current component through networks designated CR and IR. The regulating or supervisory control loop employs a current angle sensor 70 to sense the power factor or phase angle at a selected line location which is typically located at a critical area of the line at which good voltage regulation is desired. In the case of a typical arc furnace load, good voltage regulation would involve less than about ⅛% modulation of the magnitude of the 60 cycle voltage waveform. After sensing the magnitude of the phase angle at the critical line area, the supervisory control loop produces an output signal which is representative in magnitude of the phase angle as a function of time, as shown in FIG. 2c. This output signal (FIG. 2c) is dynamically compensated for stability of the supervisory regulating loop under normal gain conditions by the stabilizing circuit 85 of FIG. 1 and then acts through a path common with the compensating loop involving the IR and CR networks of FIG. 1 so as to ensure that the system remains properly compensated over a long time period.

Generally, the system shown in FIGS. 1 and 2, and more completely described in the Kelley et al patent, satisfactorily minimizes the problem presented by the erratic reactive load. However, under conditions of no load or light load, i.e., arc furnace turned off, the regulating system, or loop tends to become unstable. This tendency toward instability under no load or light load conditions is due to the fact that, under these conditions, a slight excess of, or deficiency of, inductive current is measured by the current angle sensor 70 as a phase angle of either −90° or +90°. Under these conditions, where zero phase angle regulation is desired at the critical line area, the supervisory control loop produces output signals representative of ± 90° phase angle conditions and directs the IR and CR networks of FIG. 1 to produce the appropriate compensating current. This results in a situation in which the phase angle to be regulated will swing through zero very rapidly with only a small adjustment of the compensating current. For example, when the supervisory control loop output signal indicates that the phase angle is +90°, a small increase in inductive compensating current causes the phase angle to rapidly swing through zero, resulting in a phase angle of −90°. This oscillating process continues so as to make zero phase angle regulation difficult to achieve. Further, this rapid variation may itself cause disturbances which result in poor voltage regulation. The undesirable situation in which a relatively small adjustment of compensating current causes a relatively large variation of phase angle at the critical line area can be conveniently referred to as one in which the regulating control loop exhibits excessively high gain.

An object of this invention is to develop a power system in which satisfactory voltage regulation is provided under no load, light load, and highly erratic reactance load conditions.

Another object of this invention is to develop such a power system which allows for stable regulation at other than zero phase angle.

SUMMARY OF THE INVENTION

A system is provided in which power factor, or current phase angle, is controlled in a regulating system involving the compensation of reactive current drawn by a load through the use of a reactive converter which can deliver leading or lagging current. The system includes a supervisory or regulating control loop with means for deriving first and second signals respectively representative of the line current and line to neutral voltage at a critical area in the system at which good voltage regulation is desired. The supervisory control loop further includes means including a current angle sensor for sensing the magnitude of the phase angle between the first and second signals and directing an output signal therefrom to the reactive converter so as to regulate the phase angle. The supervisory control loop further includes means for adding a signal representing an in phase component of line current to the first signal and directing the combination thereof to the current angle sensor whenever the real or in phase component of line current is less than a predetermined level. The predetermined level is defined as the minimum real line current component necessary for stable regulating loop operation.

BRIEF DESCRIPTION OF THE DRAWINGS

FIG. 4 is a schematic block diagram showin an exemplary stabilizing network useful in the power system of the present invention.

FIGS. 6 and 7 are graphical representations, as in FIG. 2, showing the operation of the power system of the prior art under no load or light load conditions.

DETAILED DESCRIPTION OF THE INVENTION

Figure 1:
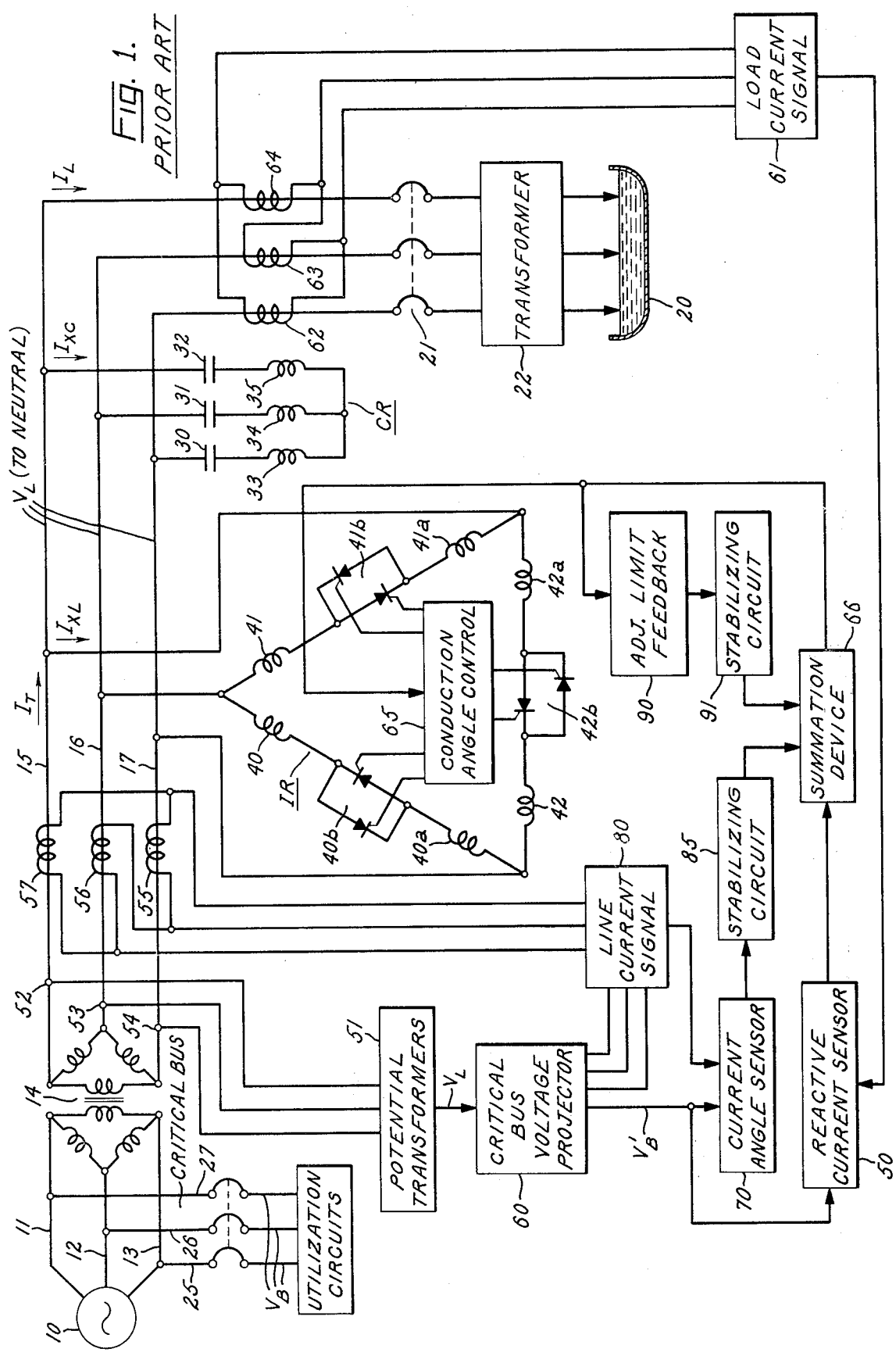
FIG. 1 is a highly schematic circuit diagram, partially in block form, of an electric power system including reactive current control means and phase controlled static switching means for a prior art electric power system, as shown in U.S. Pat. No. 3,936,727.
Figure 3:
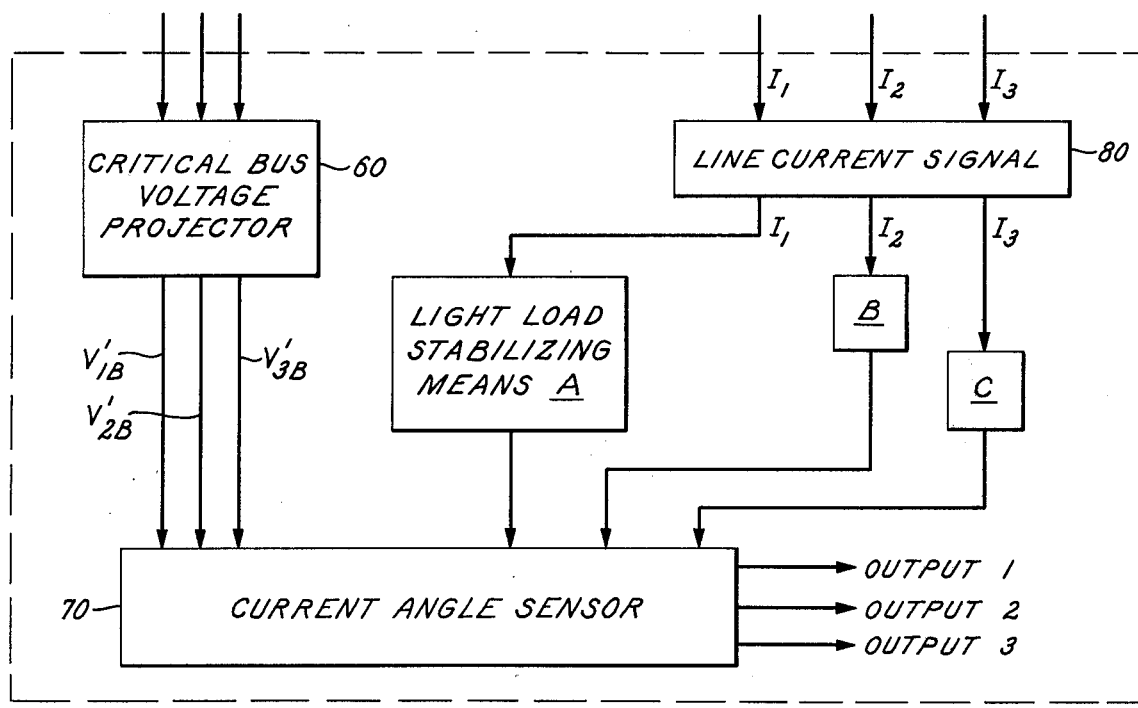
FIG. 3 is a highly schematic simplified block diagram showing a portion of the electric power system of FIG. 1, and including therein the stabilizing means of the present invention.

Referring initially to FIGS. 1 and 3, the present invention will be generally described. FIG. 1 depicts the power system disclosed in previously mentioned U.S. Pat. No. 3,936,727 while FIG. 3 shows a portion thereof which in accordance with the present invention, further includes means in simplified block diagram form for increasing the stability of the power system under varying load conditions.

As shown in FIG. 3, each line current output signal $I_1$, $I_2$, $I_3$ is respectively derived from current transformers (not shown in FIG. 3) and lines 15, 16 and 17 of FIG. 1 and is respectively passed through separate light load or no load stabilizing networks A, B and C which form part of the regulating loop. The outputs of the stabilizing networks are then directed into a current angle sensor 70. Each of the separate stabilizing networks A, B and C performs the function of adding a signal representative of a small in phase or real component of line current to the actual line current output signals $I_1$, $I_2$, $I_3$ whenever the real or in phase component of the line current is less than a predetermined level. In the present invention, the magnitude of the added signal is of a value such that the sum, i.e., $I_1$ + added signal, is substantially equal to, or greater than, the minimum signal necessary for stable power system operation, i.e., stable regulating loop operation. The predetermined level is defined as the minimum real line current component necessary for stable regulating loop operation. It is to be noted that, for purposes of clarity, only one current angle sensor 70 with three outputs is shown in FIG. 3. In practice, for a three phase system, three such current angle sensors would be provided, each having a single output.

A single exemplary network A suitable for use in the system of the present invention is shown in more detail in FIG. 4. It is to be understood that the other networks (B, C) are substantially the same. Each network includes the following: a first summation device 100; a zero cross detector 102; a pulse amplifier 104; a gate 106; sampling, storing, resetting means 108; a rectifier 110; a second summation and bias device 112; an on-off gate 114; a variable gain signal amplifier 116; and a third summation device 118. It is to be noted that each of the network elements hereinbefore mentioned are conventional and do not by themselves form any part of this invention.

The function of network A will now be described more particularly with reference to FIG. 4 and the signal waveforms illustrated in FIGS. 5a-5n. In this description, although only the condition of a single phase (line 15 of FIG. 1) and the operation of network A will be discussed, it is to be understood that the discussion is also applicable to the other two phases (lines 16 and 17) and the corresponding networks (B, C).

Referring now to FIG. 4, the summation device 100 receives as its inputs voltage signals $V'_{3B}$ and $V'_{2B}$ which are representative of line to neutral voltages at the critical bus and are derived from the Critical Bus Voltage Protector 60 of FIGS. 1 & 3. As shown in FIG. 4, input $V'_{3B}$ is inverted and then inputs $V'_{2B}$ and $-V'_{3B}$ are summed. The summed signal $V'_{2B} - V'_{3B}$, or simply $V_{23}$, is then directed to the zero cross detector 102. The zero cross detector 102 produces an output signal which is in the form of a short duration pulse when $V_{23}$ crosses through zero magnitude. The pulse amplifier 104 receives the output signal of the zero cross detector 102, when present, and increases its magnitude so as to simplify signal processing. The gate 106 receives the output signal of the pulse amplifier 104 and actuates component 108. Component 108 samples and stores the rectified current signal $I_1$ from component 110 at the appropriate instant which corresponds to the previously mentioned zero crossing of $V_{23}$. Note that, as shown in FIG. 5a, in conventional three phase power systems, the zero crossing of $V_2 = V_3$ or $V_{23}$ corresponds in time to the maximum position of $V_1$. Therefore, the gated signals (FIG. 5b) from the zero cross detector 102 of FIG. 4 correspond in time to the maximum $V_1$ value. More importantly, it is known that the reactive component of a current ($I_1$) is zero at 90° after zero crossing of the voltage signal ($V_1$) associated therewith (at maximum voltage value). Therefore, a measurement of the current $I_1$ at this point in time is a measurement of the real component only of the current $I_1$. For example, as shown in FIGS. 5b through 5e, a measurement of the current $I_1$ at this point in time reveals a real or in phase component of the current $I_1$ which, for purposes of illustration, lags the voltage $V_1$ by 75°).

Figure 5:
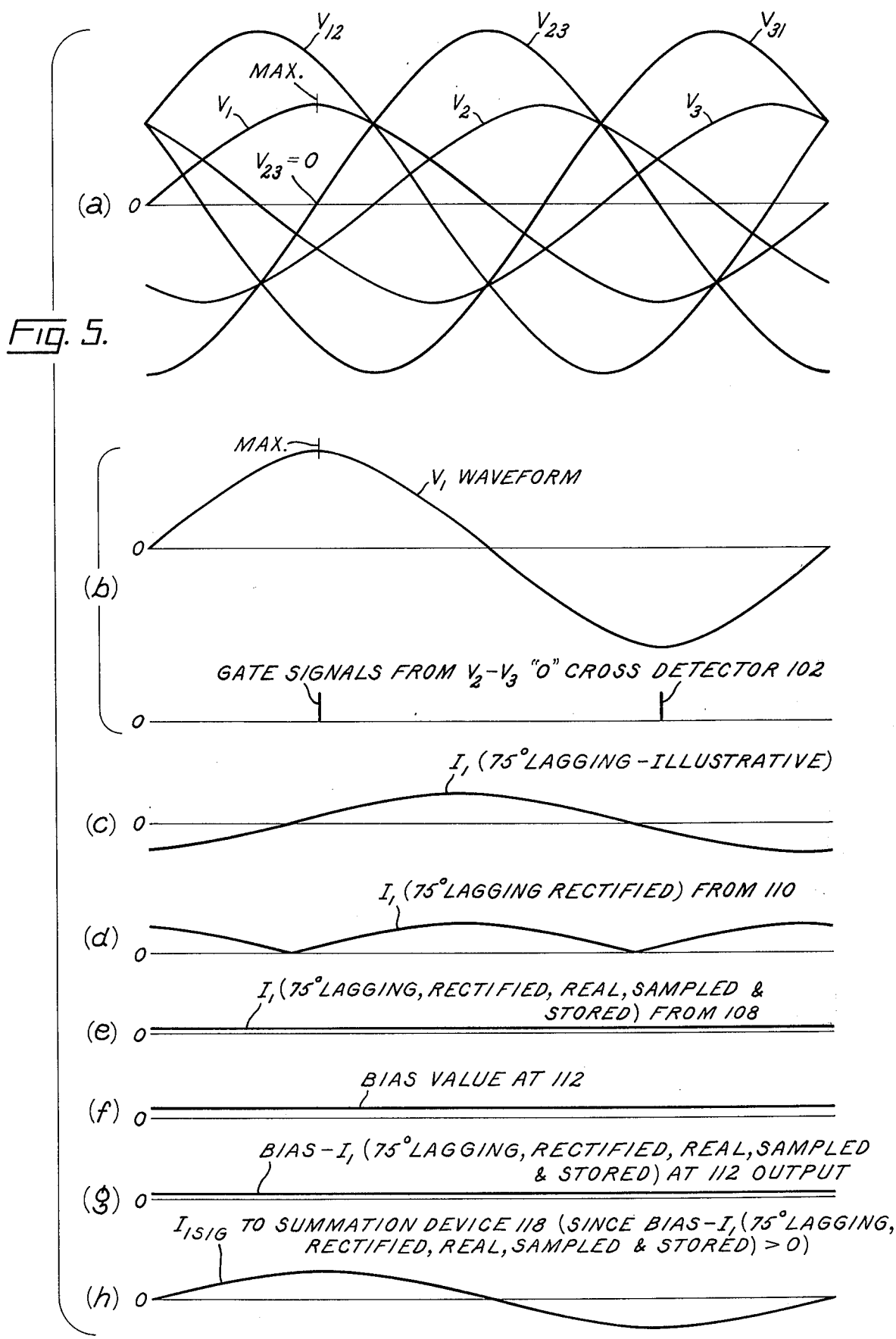
FIGS. 5a–n depict waveforms associated with the exemplary network shown in FIG. 4.

More particularly, a branch of current signal $I_1$ is rectified by rectifier 110 of FIG. 4 resulting in the signal waveform shown in FIG. 5d. Another branch of current signal $I_1$ is directed to summation device 118. The real component of the rectified current signal $I_1$ at the instant determined previously by gate 106 is sampled and stored by component 108 of FIG. 4, resulting in a signal waveform (FIG. 5e) which is unidirectional and proportional to the real component of current $I_1$. The magnitude of this signal waveform (FIG. 5e) remains constant until it is reset by the component 108. Resetting occurs upon the next sampling event which is initiated by gate 106. The magnitude of the sampled and stored signal which is proportional to the real component of current $I_1$ is then compared with a value provided by the adjustable bias 112 of FIG. 4 (see waveforms of FIGS. 5e, 5f, 5g). The adjustable bias 112 produces a signal value which is unidirectional and constant. Whenever the bias signal value at component 112 is greater than the magnitude of the real component signal of the sampled and stored real component of current $I_1$, as shown in FIG. 5g, gate 114 is actuated. This causes an additional in phase current signal $I_{1sig}$ (FIG. 5h) to be directed into summation device 118. The additional in phase signal $I_{1sig}$ is combined with the actual current signal $I_1$ by the summation device 118 of FIG. 4, and the combination directed to the current angle sensor 70. The additional current signal $I_{1sig}$ of FIG. 5h is derived through the gain adjustment of component 116 from the projected line to neutral voltage $V'_{1B}$. The additional current signal $I_{1sig}$ is proportional to, and in phase with, the voltage signal $V'_{1B}$ or simply $V_1$, which is directed through the gain amplifier 116 (see waveforms of FIGS. 5i, 5j). Note that FIGS. 5h and 5j depict the same additional current signal $I_{1sig}$. The process in which $I_{1sig}$ and $I_1$ are combined by the summation device 118 of FIG. 4 is shown in FIGS. 5j-5l for a second illustrative case in whic the current $I_1$ lags the voltage $V'_{1B}$ or simply $V_1$, by 90°.

Figure 2:
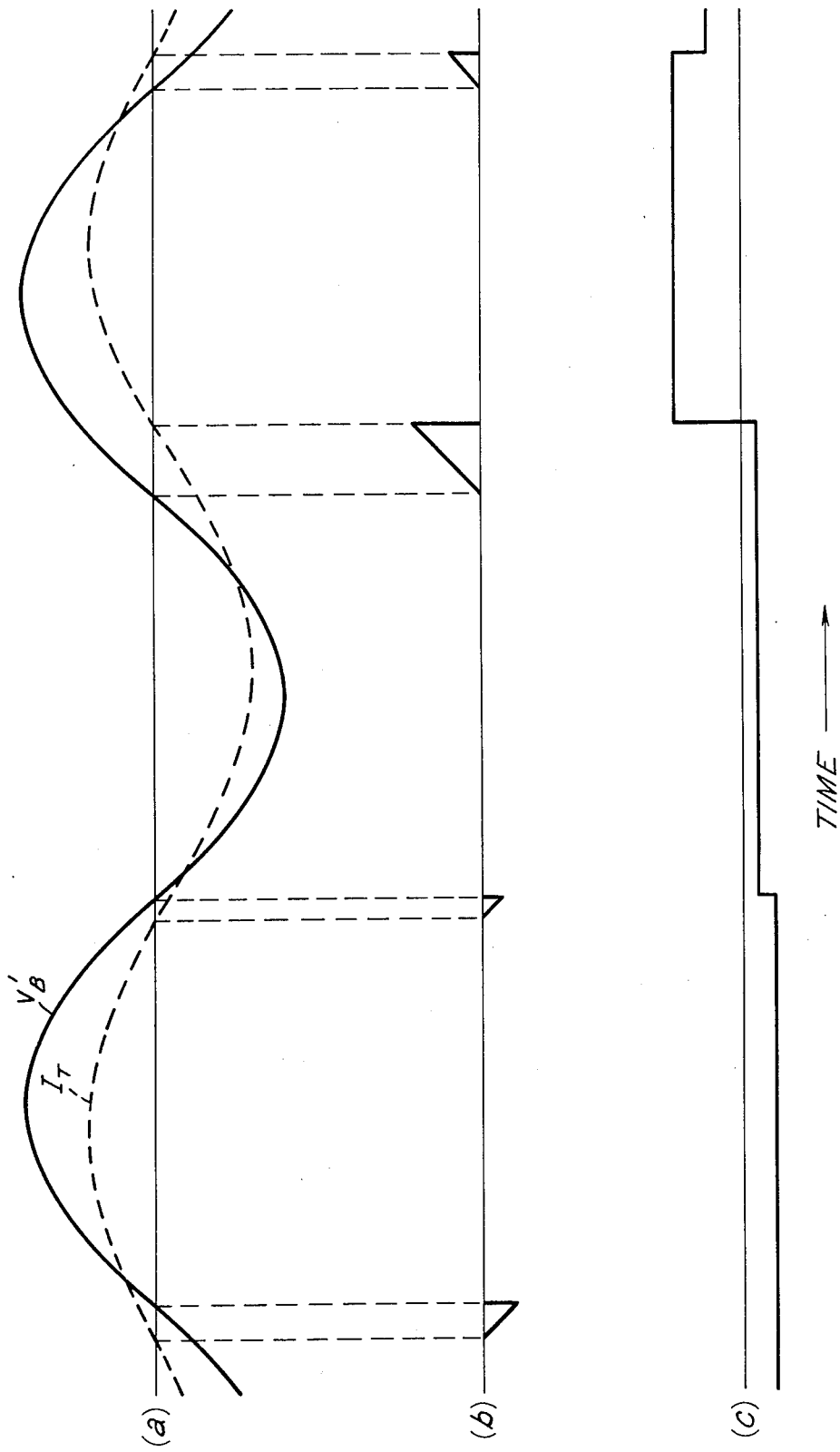
FIGS. 2(a), (b) and (c) are graphical representation of certain electrical characteristics which illustrate the mode of operation of the current angle sensor shown in the prior art electric power system of FIG. 1.

The current angle sensor 70 receives the combined signal ($I_1 + I_{1sig}$) and then develops an output signal which is directed to the reactive converter. Note that the additional process provided by summation device 118 of FIG. 4 and shown in FIGS. 5j–5m for the second illustrative case results in a situation in which the resultant signal ($I_{1sig} + I_1$) received by the current angle sensor 70 causes the current angle sensor to measure a current phase angle much smaller than the actual 90°. Note also, in connection with FIGS. 5m, 5n, that the waveforms of FIGS. 5m, 5n are provided in a manner similar to the waveforms of FIGS. 2b, 2c.

Referring now to FIGS. 6 and 7, the present invention can be more completely appreciated. FIGS. 6 and 7 are similar to FIG. 2 but show the prior art operation of the current angle sensor 70 under no load or light load conditions. As mentioned earlier, under these conditions, the current angle sensor 70 produces an output which results in a situation in which the regulated phase angle swings rapidly back and forth through zero to +90° (FIG. 6) and to −90° (FIG. 7). However, in the present invention, under the same conditions, i.e., the second illustrative case, the added signal $I_{1sig}$ functions to cause the current angle sensor to measure an angle, and produce an output therefrom, which corresponds to a value much smaller than the actual 90°. This can be observed by comparing the magnitude of the output of the current angle sensor 70 under no load conditions in the prior art system (FIGS. 6 and 7) with the corresponding output in the system of the present invention (FIG. 5n). The lowered magnitude of the current angle sensor output under the same no load conditions in the present invention dampens the oscillations which would otherwise occur between +90° and −90°.

Thus, in the present invention, a real or in phase current signal $I_{sig}$ is added to the actual line current signal I which is employed with the current angle sensor of previously mentioned U.S. Pat. No. 3,936,727. Adding the signal $I_{sig}$ at no load or very light load conditions causes the apparent phase angle, as viewed from the output of the current angle sensor 70, to respond smoothly to an adjustment of the inductive current (compensating current $I_c$) from the reactive converter. In the present invention, the gain of the regulating loop is limited to an adjustable (gain) limit, and the region of this gain lowering is adjustable by the bias value(s) chosen. This technique is particularly useful in three phase power systems. In such a case, each of the remaining line current signals $I_2$, $I_3$ at the critical area can be modified as hereinbefore described. In this connection, as mentioned earlier, such as system will typically include tree current angle sensors and the associated circuitry described more completely in previously mentioned U.S. Pat. No. 3,936,727.

Figure 8:
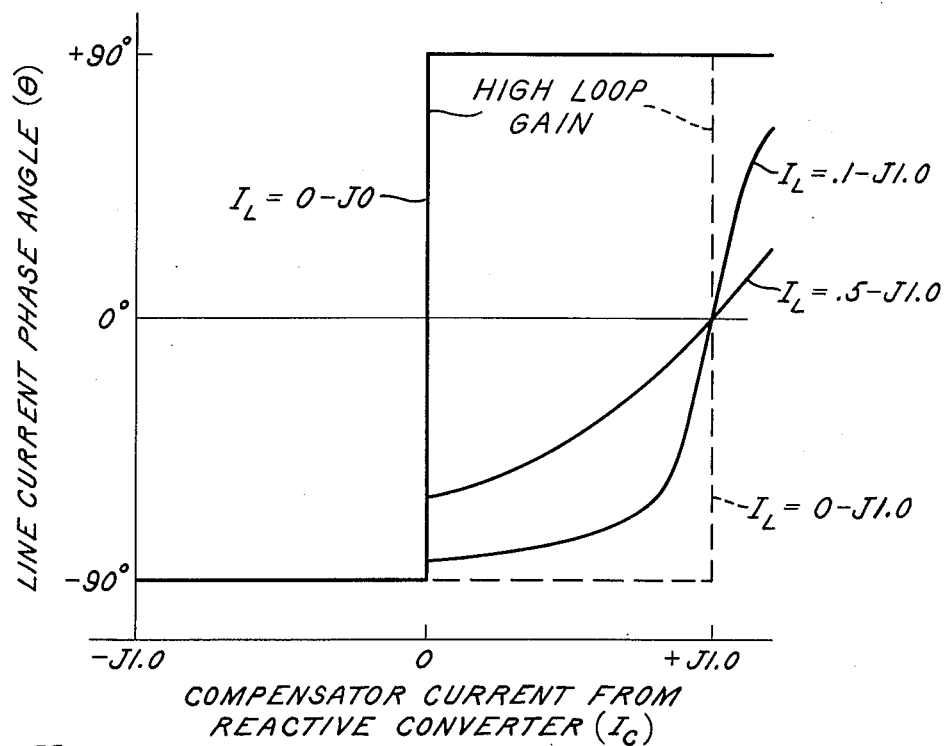
FIG. 8 is a graphical representation showing the line current phase angle ($\theta$) as a function of the compensating current ($I_c$) for several different load current values ($I_L$). In this Fig: $I_L = I_R - JI_x$; and $\theta = \tan^{-1}(I_c - I_x/I_R)$.

To obtain a preferred control system for a particular application, it may be helpful to refer to FIG. 8 and to set forth several guidelines. FIG. 8 is a graph which shows the line current phase angle ($\theta$) at the critical bus as a function of the compensating current ($I_c$) from the reactive converter for several different load currents ($I_L$). The graph includes the case of no real load current ($I_R = 0$) as well as various real load current values with one unit of −90° lag load current ($I_x$). In FIG. 8, the loop gain of the supervisory regulating loop is proportional to the slope of the characteristic ($\Delta\theta/\Delta I_c$). It can be observed that, under zero or near zero real current ($I_R$) conditions, a HIGH LOOP GAIN condition undesirably causes the phase angle ($\theta$) to swing through zero very rapidly with only a small adjustment of the compensator current ($I_c$) from the reactive converter. That is, under these conditions, the gain of the supervisory control loop approaches infinity. As the real component ($I_R$) of load current ($I_L$) is made less than about 10% of the rated compensator current ($I_c$), the loop gain [($\Delta\theta/\Delta I_c$)] increases rapidly. Thus, in a preferred control system, to engender stability and involve suitable dynamic response of the regulating system, the regulating or supervisory loop gain is reduced by adding a signal representative of the appropriate in phase current, as previously described, whenever the real component ($I_R$) of load current ($I_L$) is less than about 10% of the rated compensator current ($I_c$).

Adjustment of the bias value of FIG. 4 to obtain the situation where the appropriate signal is added whenever the real component ($I_R$) of load current is less than about 10% of the rated compensator current ($I_c$) can be achieved as follows: Scaling associated with signal $I_1$, the mechanism of the rectifier 110 and the sampling, storing resetting means 108 of FIG. 4 define the relative magnitude of $I_1$ rectified real. By a similar scaling, rectifying, sampling, storing, resetting process for the determination of the reactive component of compensator current ($I_c$), a relative magnitude of rated compensator current ($I_c$) rectified reactive is determined. The bias is then set at 10% of this value so as to actuate the previously described regulating loop stabilizing mechanism for load conditions involving less than 10% real relative current.

Although the power system of the present invention has been hereinbefore illustrated with a particular light load or no load stabilizing network(s), other means may be substituted therefor. One such technique is to provide means which continuously adds an in phase current signal to the current angle sensor while the power system is energized. This rather crude approach will engender stability at no load or light load conditions at zero phae angle regulation. However, this technique will engender error in the phase angle measurements and regulation at other than zero phase angle regulation even when the supervisory regulating loop would otherwise be stable. This error in phase angle regulation at other than zero phase angle regulation is present in the previously described preferred regulating system only when the system would otherwise be unstable. The advantage of the preferred system over the more crude approach can be appreciated by noting that, in a typical application including an arc furnace, conditions are such that the regulating loop, if not corrected, will tend to be unstable about 5% to 10% of its operating time. Thus, in the preferred system, there is a trade off of non-zero phase angle regulation capability for stability only during 5% to 10% of operating time.

Also, although the light load or no load stabilizing means of the present invention has been described with regard to a particular power regulation system, i.e., the system disclosed in U.S. Pat. No. 3,936,727, it is also applicable to other systems. For example, it is generally applicable to power regulating systems involving the control of the current angle or power factor in the event that no-load or light real load component conditions may occur.

While I have illustrated a preferred embodiment of my invention by way of illustration, many modifications will occur to those skilled in the art and I therefore wish to have it understood that I intend in the appended claims to cover all such modifications as fall within the true spirit and scope of my invention.

What is claimed as new and desired to be secured by Letters Patent of the United States is:

1. In a power system of the type having: a reactive converter for delivering a leading or lagging current to compensate for a load of varying reactance; means for deriving first and second signals respectively representative of the line current and line to neutral voltage at a critical area in the system at which good voltage regulation is desired; and means including a current angle sensor for sensing the magnitude of the phase angle between said first and second signals and then directing an output signal therefrom to the reactive converter so as to regulate the phase angle, wherein the improvement comprises:

means for adding an in phase current component signal to said first signal and directing the combination thereof to said current angle sensor.

2. A power system in accordance with claim 1 in which said means for adding said in phase current component signal includes means for continuously adding said in phase current component signal to said first signal.

3. A power system in accordance with claim 1 in which said means for adding said in phase current component signal includes means for adding said signal whenever the system would otherwise be unstable.

4. A power system in accordance with claim 1 in which said means for adding said in phase current component signal further comprises:

a. means for sensing the magnitude of the in phase component of said line current at said critical area and producing an output signal which is representative thereof;
b. means for receiving said output signal at a) and determining whether said magnitude of said in phase current component is insufficient to result in stable power system operation; and
c. means for adding said in phase current component signal to said first signal and directing the combination thereof to said current angle sensor whenever said in phase current component of said line current is determined to be insufficient.

5. A power system in accordance with claim 4 which includes three phases and in which said means of a) for sensing the magnitude of said in phase current component of said line current includes means for summing at least two voltage signals of said three phases and determining when the summation corresponds to zero.

6. A power system in accordance with claim 4 in which said means of b) for receiving said output signal representative of the magnitude of the in phase component of said line current includes means for comparing said in phase component output signal to an adjustable bias value which represents the minimum in phase current component which is sufficient for stable power system operation.

7. A power system in accordance with claim 6 in which said means of c) for adding said in phase current component signal includes means for directing said combination into said current angle sensor whenever said output signal representative of the magnitude of said in phase current component is less than said adjustable bias value.

8. A power system in accordance with claim 7 in which said means of c) for adding said in phase current component signal includes means for deriving said added in phase current component signal from the line to neutral voltage waveform associated therewith.

9. Reactive current supply apparatus for an a-c electric power system including a critical voltage supply bus electrically separated by series impedance from load terminals which are adapted for connection to a major load subject to rapid oscillatory variation of reactive current demand comprising: fixed capacitor means connected across said load terminals, fixed inductor means connected across said load terminals in series circuit relation with static switching means, said static switching means including gating means for phase controlling the conduction angle of said switching means thereby to control the magnitude of reactive current traversing said inductor means, means for generating a unidirectional electrical signal representative in direction of the phase relation of the reactive component of load current at said load terminals and representative in magnitude to the magnitude of said reactive component of load current, means responsive to said electric signal for so controlling said gating means that the sum of the reactive currents traversing said fixed capacitor means and said fixed inductor means is substantially equal and opposite to said reactive component of load current, and, means for deriving first and second signals respectively representative of the line current and line to neutral voltage at said critical voltage supply bus, means including a current angle sensor for sensing the magnitude of the phase angle between said first and second signals and directing an output signal therefrom to said static switching means so as to regulate the phase angle, wherein the improvement comprises:

a. means for sensing the magnitude of the in phase component of said line current at said critical bus and producing an output signal which is representative thereof;
b. means for receiving said output signal representative of the in phase component of said line current and determining whether said magnitude of said in phase current component is insufficient to result in stable power system operation; and
c. means for adding an in phase current component signal to said first signal and directing the combination thereof to said current angle sensor whenever said in phase current component is determined to be insufficient to result in stable power system operation.

10. Reactive current supply apparatus in accordance with claim 9 which includes three phases and in which said means of a) for sensing the magnitude of said in phase current component of said line current includes means for summing at least two voltage signals of said three phases and determining when the summation corresponds to zero.

11. Reactive current supply in accordance with claim 9 in which said means of b) for receiving said output signal representative of the in phase component of said line current includes means for comparing the magnitude of said in phase component output signal to an adjustable bias value which represents the minimum in phase current component which is sufficient for stable power system operation.

12. Reactive current supply in accordance with claim 11 in which said means of c) for adding said in phase current component signal includes means for directing said combination to said current angle sensor whenever said output signal representative of said in phase current component is less than said adjustable bias value.

13. Reactive current supply in accordance with claim 11 in which said means of c) for adding said in phase current component signal includes means for deriving said added in phase current component signal from the line to neutral voltage waveform associated therewith.

14. In a power system of the type having: compensating loop means including a reactive converter for delivering a leading or lagging current to compensate for a load of varying reactance; and, regulating loop means including means for deriving first and second signals respectively representative of the line current and line to neutral voltage at a critical area in the system at which good voltage direction is desired, means including a current angle sensor for sensing the magnitude of the phase angle between said first and second signals and directing an output signal therefrom to the reactive converter so as to regulate the phase angle, wherein the improvement comprises:

a. means for determining with the magnitude of the loop gain of said regulating means if of a value which causes unstable regulating loop operation, and b. means for reducing said regulating loop gain by adding an in phase current component signal to said first signal and directing the combination thereof to said current angle sensor when said regulating loop gain is determined to be of a value which causes unstable regulating loop operation.

15. A power system in accordance with claim 14 in which said means of a) for determining when the magnitude of said regulating loop gain is of a value which causes unstable operation includes means for determining if the magnitude of the in phase current component of the line current of said critical area is less than about 10% of the value of the magnitude of the compensating current provided by said reactive converter.

* * * * *